Aug. 31, 1926.

A. SEIDEL 1,597,730

CHANGE SPUR GEARING ESPECIALLY FOR MOTOR DRIVEN VEHICLES

Filed March 12, 1925

Patented Aug. 31, 1926.

1,597,730

UNITED STATES PATENT OFFICE.

ARNOLD SEIDEL, OF BERLIN-CHARLOTTENBURG, GERMANY.

CHANGE SPUR GEARING ESPECIALLY FOR MOTOR-DRIVEN VEHICLES.

Application filed March 12, 1925, Serial No. 15,157, and in Germany February 29, 1924.

The invention relates essentially to change spur gearings, especially for motor driven vehicles. It has become known, to hold, in gearings of this type, the pair-wise arranged spur wheels permanently in gear and to bring the same into gear by means of a number of control elements with make and break keys. This form of construction is considerably simplified, according to the invention, by holding together all the pairs of spur wheels by a common, shiftable control element and by coupling the same with their coupling keys or tappets singly with a set of keys on the corresponding shafts. In further development of the invention a separate set of keys is arranged on the shafts of the gearing for the first speed and reverse as well as for the second speed and third speed (in four speed gearings).

An embodiment of the invention is shown on the accompanying drawings, by way of example, in which:—

Figure 1:
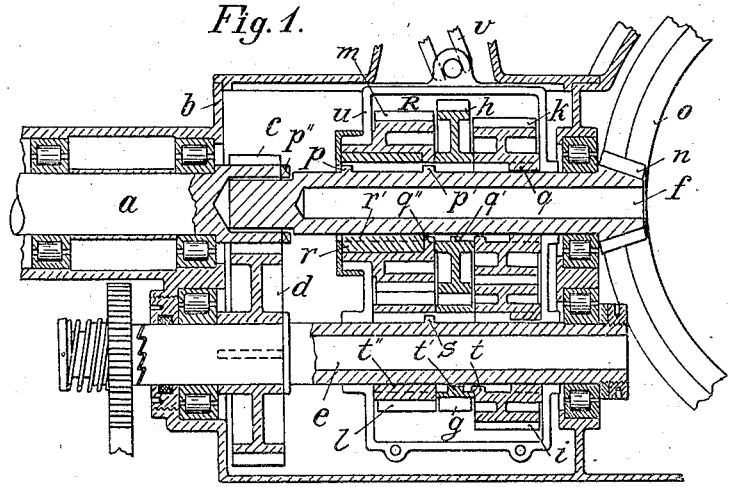
Fig. 1 shows in cross section the preferred form of construction of the improved change spur gearing.

In the gearing shown in Fig. 1 it is supposed that the main shaft be subdivided and that, at direct transmission, the transmission of the movement from the driving part of the main shaft to the driven part, is effected through the intermediary of a counter shaft which permanently revolves at only about half the circumferential speed of the main shaft.

$a$ is the driving part of the main shaft and journaled in the casing $b$. The power is transmitted from this part $a$ of the main shaft through the intermediary of the transmission wheels $c$ $d$ upon the countershaft $e$. The countershaft $e$ is connected with the driven part $f$ of the main shaft:

1st for the first speed through the intermediary of wheels $g$, $h$,

2nd for the second speed through the intermediary of wheels $i$, $k$,

3rd for the reverse R through the intermediary of wheels $l$, $m$, between which an intermediate wheel, not visible on the drawing, the so-called reversing wheel, is inserted.

The power is transmitted from the driven part $f$ of the main shaft to the rear wheel axle by means of the bevel wheels $n$, $o$.

The change speed wheels have on their circumferences keys which are adapted to clutch with a set of keys on the shaft $e$ and $f$. To clearly illustrate the arrangement of the keys only the keys on the shafts $e$, $f$ are shown on the drawing, in the upper part of Fig. 1, while in the lower part of this figure the tappets or keys on the wheels or sleeves are shown.

On shafts $f$ the keys $p^1$ are provided; wheel $k$ has keys $q$, wheel $h$ keys $q'$ wheel $m$ keys $q''$. On the rotatable sleeve $r$ inserted into wheel $m$ long keys $r'$ are further arranged which co-operate with a separate set of keys $p$ on shaft $f$.

On the shaft $e$ keys $s$ are arranged in a similar manner, the wheel $i$ having tappets $t$, the wheel $g$ tappets $t'$ and the wheel $l$ tappets $t''$. It has to be remarked that for effecting a speed changing the keys on one shaft must be larger than those of the other. Preferably, the keys on the counter shaft $e$ will be slightly larger on both sides than those on the part $f$ of the main shaft, in order that at the coupling at first the change speed wheels on the counter shaft, which revolves only at half speed, and then the change speed wheels on the main shaft are thrown in gear.

The wheels $i$, $k$, $g$—$h$, $l$—$m$ and the sleeve $r$ are enclosed in one single change speed element $u$ in the shape of a closed casing adapted to be shifted by means of a fork $v$. On the driving part of the main shaft $a$ keys $p''$ are arranged the purpose of which will be hereinafter explained.

In the position shown the wheels $m$ and $l$ are coupled with the shafts $f$ and $e$ so that reverse is put in. When the control element is slightly shifted to the left, the keys $p'$ engage at first with the space between the keys $q'$ and $q''$, the keys $p$ moving along the long keys $r'$ of sleeve $r$. The sleeve $r$ continues therefore to rotate with shaft $f$, while wheel $m$ is stopped. At this shifting movement the keys $t''$ of wheel $l$ have disengaged from the keys $s$ of shaft $a$ so that the wheels on the countershaft $e$ are also uncoupled.

When the movement of the control element $u$ continues the keys $p'$ engage with the keys $q'$ and on the countershaft $e$ the keys $s$ with the keys $t'$. The first speed is put in, the movement being transmitted from shaft $a$ over wheels $c$—$d$, the counter shaft $e$ and wheels $g$—$h$ to shaft $f$ and the toothed wheels $n$—$o$.

When the control element is still further shifted the keys $p'$ and $s$ arranged at the gaps between the keys $q'$ and $q$ or $t''$ and $t$ so that an uncoupling is effected before the new coupling by means of the keys $q$ and $t$ begins, the second speed being then put in through the intermediary of the wheels $i$—$k$.

When the control element $u$ is shifted further to the left the wheels $i$ and $k$ are disengaged again from their shafts, the keys $r'$ coming in engagement with the keys $p''$ on the driving part $a$ of the main shaft. As the key $p$ remains in engagement with the keys $r'$ the movement is now transmitted from shaft $a$, through the intermediary of sleeve $r$, directly upon the shaft $f$, and the third speed is put in.

Figure 2:
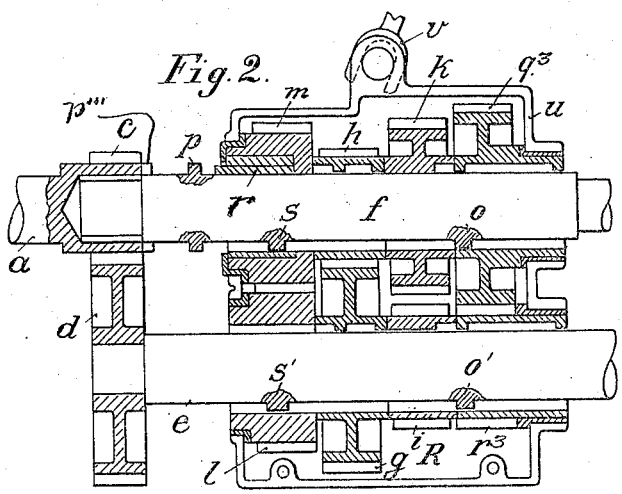
Fig. 2 shows in cross section a second form of construction for four speed gearing.
Figure 3:
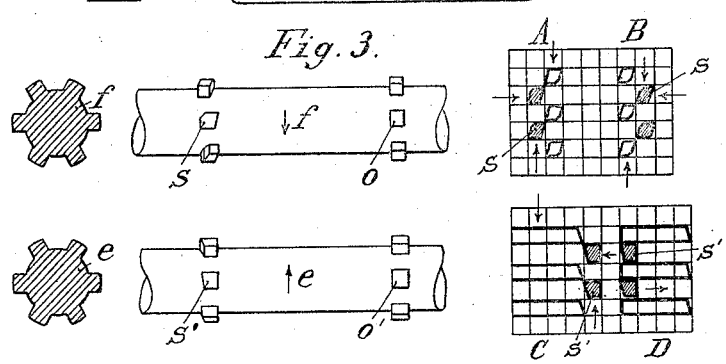
Fig. 3 illustrates a special construction of the keys $s$, $s$ and $o$, $o$ on the shafts of the gearing.

In the change spur gearing for four speed gearings, shown in Figs. 2 and 3 the power is transmitted from the driving part $a$ of the main shaft upon the counter shaft $e$ by the wheels $c$ $d$ in the same manner as in the first form of construction. The wheels $c$ and $d$ cause the shafts $e$ and $f$ to rotate in the direction of the arrows in Fig. 3 of the drawing. The connection of the counter shaft $e$ with the driven part $f$ of the main shaft can be effected in four different manners, viz:—

1. For the first speed through the intermediary of the wheels $r^3$, $q^3$,
2. For the second speed through the intermediary of the wheels $l$, $m$,
3. For the third speed through the intermediary of the wheels $q$, $h$,
4. For the reverse R through the intermediary of the wheels $i$, $k$, between which an intermediate wheel, not visible on the drawing, the so-called reversing wheel, is inserted. The power is transmitted again from the driven part $f$ of the main shaft, through the intermediary of bevel wheels, upon the rear wheel axle. The change speed wheels have keys on their circumferences adapted to come in engagement with a set of keys on the shafts $e$ and $f$. In the lower part of Fig. 2 only the keys on the shafts $e$ $f$ and in the upper part of Fig. 2 only the keys on the wheels or sleeve are shown. On the shafts $e$ and $f$ of the bearing the keys $s$, $s'$ for the counter keys of the wheels $m$, $l$ of the second speed and of the wheels $h$, $g$ of the third speed are mounted and further the keys $o$, $o'$ for the counter keys of the wheels $q^3$, $r^3$ of the first speed and of the wheels $k$, $i$ for reverse. (The reversing wheel is not shown). The shaft $f$ has other keys $p$ designed to co-operate with the continuous counter keys of the sleeve $t$ for the direct drive. A common control element $u$ covers all the change speeds and the sleeve $t$, a fork $v$ serving to shift said control element $u$ on the shafts of the gearing.

In Fig. 2 the wheels $q^3$ $r^3$ of the first speed are coupled with the keys $o$, $o'$ of the shafts $e$, $f$. The first speed is put in. The change to reverse is effected by shifting all the toothed wheels to the right over the keys $o$, $o'$, the second, third and fourth speed being put in by shifting to the left from the position shown so that first the keys $s$, $s'$ come in engagement successively with the different change speed wheels and then, for direct drive, the keys $p$, $p'''$ are brought in engagement through the intermediary of sleeve $r$. The direct drive is the said fourth speed. In the form of construction shown the toothed wheel $l$ of the second speed remains in gear on the counter shaft $e$ during the first speed and the reverse, so that the two gear wheels $l$, $m$ rotate idle at these two speeds. At the second, third and fourth speed no pair of gear wheels runs idle.

Fig. 3 shows another construction of the keys $s$, $s'$ and $o$, $o'$. The counter keys of the of the corresponding wheels are constructed in similar manner. The keys $o$, $o'$ have similar to the commonly used claw couplings, greater play between the counter keys of the wheels in order to facilitate the putting in of the speeds. The keys $s$ have also special play between the counter keys of the corresponding wheels and an especially easy engagement is furher produced by the bevelling of the side faces $w$. The bevelled faces are chosen in such a manner that the gear wheel $m$ at the changing from the first to the second speed draws the shaft $f$ along which rotates more slowly from the first speed, the wheel $h$ drawing the shaft $f$ along at the changing from the second to the third speed. Inversely at the changing from the fourth speed to the third speed and from the third speed to the second the keys $s$ of shaft $f$ draw the wheel $h$ along at the third speed and the wheel $m$ at the second speed, as at the changing from higher to lower speed the shaft $f$ rotates more rapidly than the gear wheels. For this reason the keys of the shafts and of the wheels are parallel to one another as at the forward changing from the first to the second speed the opposite face of the key operates the same as at the changing from the third to the second speed. The keys $s$ on the shaft $f$ and the counter keys $s'$ of the change speed wheels of the second and third speed are bevelled in opposite directions to the keys $s'$ of the counter shaft $e$. The keys $s$ are bevelled, in the form of construction shown, only on one side as they act at one side only. The keys $p$ and the counter keys of the sleeve $r$ are constructed in similar manner for the putting in of the direct drive.

These keys act evidently also on one side only as the direct drive is a final change and not an intermediate change.

This improved form of construction produces the following new effects:—

(1) In one direction five speeds are successively put in, the change speed gearing being of the shortest possible length. The speeds are one reverse and four speeds at going forwards, all the gear wheels remaining permanently in gear, an idle running of gear wheels being avoided either at all speeds or only at the most important speed, viz: the second, third and fourth speed.

(2) All the gear wheels are well guided on the shafts.

(3) The putting in of the second, third and fourth speed can be effected with the greatest ease at all speeds as the time at disposal for the throwing in gear amounts to a multiple of, about ten times, the time which is left at the commonly provided play of about 2 mm between the claws. The diagrams A and B in Fig. 3 illustrate diagrammatically that the rearwardly inclined edges of the moderately bevelled operating faces are cut off obliquely at a sharp angle, the arrows in the diagrams at the right hand side of Fig. 3 indicating the direction considered as front with respect to the rearward bevelling of the keys. For this strong bevellings (rounding off with a greater radius) may be substituted. Owing to this construction it is possible to change the speeds in both directions of revolution, in a specially favorable manner in the one direction of rotation and with normal effect in the other direction.

The diagram A illustrates diagrammatically the putting in gear of the keys $s$ of shaft $f$ with the counter keys of the toothed wheel $m$ for the second speed at the changing from the first to the second speed.

Diagram B illustrates diagrammtically the putting in gear of the keys $s$ of shaft $f$ with the counter keys of the toothed wheel $m$ for the second speed at the changing from the third to the second speed.

Diagram C illustrates diagrammatically the putting in gear of the keys $s'$ of shaft $e$ with the counter keys of the toothed wheel $l$ for the second speed at the changing from the third to the second speed.

Diagram D illustrates diagrammtically the putting in gear of the keys $s'$ of the shaft $e$ with the counter keys of the toothed wheel $l$ for the second speed at the changing from the first speed to the second speed.

I claim:—

1. A change spur gearing, especially for motor driven vehicles comprising in combination with the driving shaft, the driven shaft and the counter shaft, pairs of gear wheels permanently in gear, a shiftable control element in the form of a casing holding all said pairs of gear wheels, means for shifting said control element, and sets of keys on said driven shaft and on said counter shaft with which said gear wheels are successively brought in engagement, keys on said driving shaft, a sleeve moving with said control element and being permanently in gear with the keys of the driven shaft designed to be coupled with the driving shaft for the direct drive.

2. A change spur gearing especially for motor driven vehicles, comprising in combination a driving shaft, a driven shaft and a counter shaft, pairs of gear wheels permananently in gear, a shiftable control element consisting of a casing holding together all of said pairs of gear wheels, means for shifting said control element, a sleeve moving with said control element, keys on said driving shaft for coupling and a separate set of keys on said counter shaft and on said driven shaft for the first key and for reverse and for the second and third speed with which sets of keys said gear wheels are successively brought in engagement, said sleeve being permanently in gear with the keys of the driven shaft designed to be coupled with the driving shaft for the direct drive.

3. A change spur gearing shaft for motor driven vehicles, comprising in combination a driving shaft, a driven shaft and a counter shaft, pairs of gear wheels permanently in gear, a shiftable control element in the form of a casing holding together all of said pairs of gear wheels, means for shifting said control element, a sleeve moving with said control element, keys on said driving shaft for coupling said sleeve for direct drive, and a separate set of keys on said counter shaft and on said driven shaft for the first speed and for reverse and for the second and third speed, with which sets of keys said gear wheels are successively brought into engagement, those sets of keys on the counter shaft and on the driven shaft which serve for transition engagement from one speed to another having beveled faces, said sleeve being permanently in gear with the keys of the driven shaft designed to be coupled with the driving shaft for the direct drive.

4. A change spur gearing shaft for motor driven vehicles, comprising in combination a driving shaft, a driven shaft and a counter shaft, pairs of gear wheels permanently in gear, a shiftable control element in the form of a casing holding together all of said pairs of gear wheels, means for shifting said control element, a sleeve moving with said control element, keys on said driving shaft for coupling said sleeve for direct drive, and a separate set of keys on said counter shaft and on said driven shaft for the first speed and for reverse and for the second and third speed, with which sets of keys said gear wheels are successively brought into engagement, those sets of keys on the counter shaft and on the driven shaft which serve for transition engagement from one speed to another having beveled faces; the beveling of said faces extending rearwardly and presenting approximately sharp edges to the receding edges of two beveled faces whereby the keys begin with a moderate beveling and drop sharply, said sleeve being permanently in gear with the keys of the driven shaft, designed to be coupled with the driving shaft for the direct drive.

In testimony whereof I affix my signature.

ARNOLD SEIDEL.